No. 675,243. Patented May 28, 1901.
J. K. PROCTOR.
ATOMIZER.
(Application filed July 3, 1900.)
(No Model.)
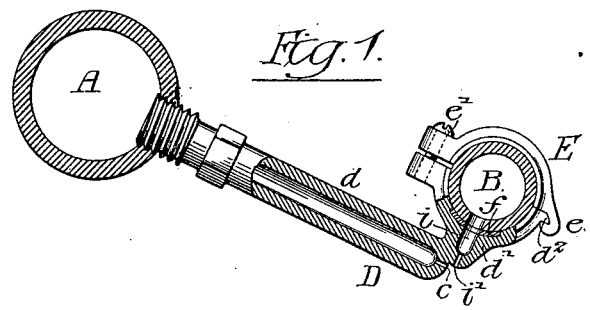
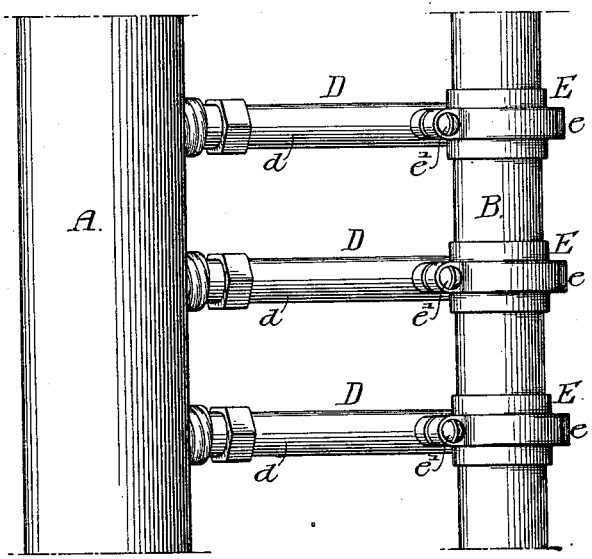
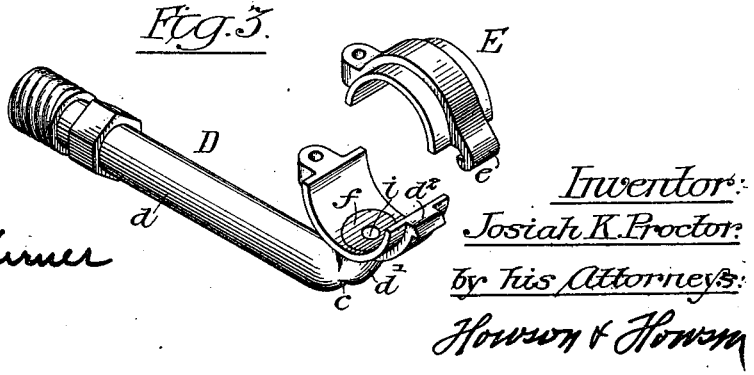
Witnesses:—
Hamilton D. Turner
Louis M. F. Whitehead
Inventor:—
Josiah K. Proctor.
by his Attorneys
Howson & Howson
THE NORRIS PETERS CO., PHOTO-LITHO., WASHINGTON, D. C.

UNITED STATES PATENT OFFICE.

JOSIAH K. PROCTOR, OF PHILADELPHIA, PENNSYLVANIA, ASSIGNOR TO THE PHILADELPHIA TEXTILE MACHINERY COMPANY, OF SAME PLACE.

ATOMIZER.

SPECIFICATION forming part of Letters Patent No. 675,243, dated May 28, 1901.

Application filed July 3, 1900. Serial No. 22,429. (No model.)

*To all whom it may concern:*

Be it known that I, JOSIAH K. PROCTOR, a citizen of the United States, residing in Philadelphia, Pennsylvania, have invented certain Improvements in Atomizers, of which the following is a specification.

The main object of my invention is to construct an atomizer for spraying water or other liquids by means of steam or air under pressure, so that it can be readily applied to ordinary tubing and can be cheaply and accurately manufactured.

A further object of the invention is to so construct the atomizer that any number of them can be arranged side by side, so as to spray an extended area.

In the accompanying drawings, Figure 1 is a sectional view illustrating my invention. Fig. 2 is a plan view showing a series of atomizers attached to two supply-pipes, and Fig. 3 is a perspective view of the atomizer detached.

A is the steam or air supply pipe, B the supply-pipe for water or other liquid, and D is the atomizer.

The atomizer D consists of two parts $d$ and $d'$. The part $d$ is hollow throughout and is screw-threaded at one end and is screwed into the pipe A. The opposite end of the part $d$ has a small outlet-passage $c$. The part $d'$ has two arms which partly encircle the pipe B, and between the arms is a passage $i$, terminating in a reduced passage $i'$ at right angles to the passage $c$ in the present instance.

In order to readily secure the atomizer to the pipe B, I use a clamp E, having a hook $e$, which engages with the lip $d^2$ on one of the arms of the part $d'$. A confining-screw $e'$ passes through a lug on the opposite side of the clamp E and into a lug on the other arm of the part $d'$, so that on turning the screw the atomizer is securely clamped to the pipe B, the atomizer thus holding the two pipes A and B rigid in respect to each other.

The pipe B is perforated in line with the passage $i$ in the part $d'$ of the atomizer, and a washer $f$ is placed in a recess in the part $d'$, surrounding the passage, so as to make a water-tight joint.

It will be noticed by referring to Fig. 2 that a series of these atomizers can be arranged close together and rigidly secured to the pipes A and B by simply boring a series of holes in each pipe and cutting screw-threads in the pipe A. Then by simply screwing the series of atomizers in the pipe A and clamping them to the pipe B the several atomizers are quickly assembled in proper position. If, for instance, water and steam are used, water is introduced in the pipe B and steam introduced into the pipe A. The pressure of the steam through the small openings will atomize the water as it comes from the pipe B through the passages $i$, forming a thin mist, which will spray the material against which it is directed.

It will be understood that my invention can be used in spraying any suitable liquids by means of any fluid under pressure.

I claim as my invention—

1. The combination in an atomizer, of two pipes, a body secured to one pipe and having one end constructed to form a clamp encircling the other pipe and holding the body thereto, passages in said body opening at an angle and in close proximity to each other, one passage communicating with one pipe and the other communicating with the other pipe, substantially as described.

2. The combination of two pipes arranged side by side, with a series of independent atomizers secured to said pipes, passages in each atomizer communicating with said pipes, one end of each atomizer having on it a clamp constructed to engage with one of the pipes and to rigidly hold said atomizer, substantially as described.

3. The combination in an atomizer, of two pipes arranged side by side, a series of tubular sections each having two passages therein one at an angle to the other and forming an atomizer, one end of each section being screwed into an opening in one pipe and a clamp by which the other end of each section is secured to the other pipe, the passages in the sections communicating with the pipes, substantially as described.

4. An atomizer having passages opening at an angle and in close proximity to each other, screw-threads on one end of the atomizer and a clamp on the other end through which one of said passages opens, a recess in the clamp surrounding said opening and material in said recess whereby a fluid-tight joint is obtained between the end of the atomizer and any object to which it is clamped, substantially as described.

In testimony whereof I have signed my name to this specification in the presence of two subscribing witnesses.

JOSIAH K. PROCTOR.

Witnesses:
NESTER ATKINSON,
WM. H. MACMUNN.